United States Patent
Park et al.

(10) Patent No.: US 8,467,431 B2
(45) Date of Patent: Jun. 18, 2013

(54) HUMAN BODY COMMUNICATION SYSTEM AND COMMUNICATION METHOD THEREOF

(75) Inventors: Ki-Hyuk Park, Daejeon (KR); In-Gi Lim, Daejeon (KR); Sung-Weon Kang, Daejeon (KR); Hyung-Il Park, Daejeon (KR); Chang-Hee Hyoung, Daejeon (KR); Jung-Hwan Hwang, Daejeon (KR); Jin-Kyung Kim, Daejeon (KR); Duck-Gun Park, Daejeon (KR); Tae-Wook Kang, Daejeon (KR); Sung-Eun Kim, Seoul (KR); Jung-Bum Kim, Daejeon (KR); Kyung-Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 408 days.

(21) Appl. No.: 12/747,051

(22) PCT Filed: May 9, 2008

(86) PCT No.: PCT/KR2008/002643
§ 371 (c)(1),
(2), (4) Date: Jun. 9, 2010

(87) PCT Pub. No.: WO2009/075420
PCT Pub. Date: Jun. 18, 2009

(65) Prior Publication Data
US 2010/0272156 A1    Oct. 28, 2010

(30) Foreign Application Priority Data
Dec. 13, 2007 (KR) .................. 10-2007-0129774

(51) Int. Cl.
*H04L 7/00*        (2006.01)
*H04L 27/00*       (2006.01)
*H04B 1/707*       (2006.01)

(52) U.S. Cl.
USPC .................... 375/146; 375/145; 375/149

(58) Field of Classification Search
USPC ............... 375/341, 343, 145, 146, 147, 130, 375/149, 142, E01.002; 455/41.1
See application file for complete search history.

(56) References Cited

U.S. PATENT DOCUMENTS
5,081,644 A *   1/1992  Uchida et al. ............... 375/130
5,677,927 A    10/1997  Fullerton et al.
(Continued)

FOREIGN PATENT DOCUMENTS
JP   05-292062 A   11/1993
JP   06-350561 A   12/1994
(Continued)

OTHER PUBLICATIONS

T.G. Zimmerman, "Personal Area Networks: Near-field intrabody communication," IBM Systems Journal, 1996, pp. 609-617, vol. 35, Nos. 3&4, IBM.
(Continued)

*Primary Examiner* — Aristocratis Fotakis (57) ABSTRACT

A human body communication system is provided. The human body communication system includes a transmitter and a receiver. The transmitter transmits a frame including a preamble, which is a Manchester-encoded pseudo noise (PN) code, to the human body. The receiver receives the frame from the human body, performs Manchester-decoding on the frame, performs cross-correlation on the decoding result and the PN code, and performs frame synchronization using the cross-correlation result. Accordingly, clock and data recovery performance is improved. Efficient frame synchronization with reduced computation amount can be provided.

13 Claims, 9 Drawing Sheets

U.S. PATENT DOCUMENTS

| | | | |
|---|---|---|---|
| 2003/0092973 A1* | 5/2003 | Kim et al. | 600/300 |
| 2006/0136015 A1* | 6/2006 | Park et al. | 607/60 |
| 2006/0203925 A1* | 9/2006 | Pirooz et al. | 375/260 |
| 2006/0251154 A1* | 11/2006 | Ettorre et al. | 375/148 |
| 2009/0122972 A1* | 5/2009 | Kaufman et al. | 379/265.12 |
| 2010/0074257 A1* | 3/2010 | Lim | 370/392 |
| 2010/0246643 A1* | 9/2010 | Lim et al. | 375/147 |
| 2010/0329380 A1* | 12/2010 | Kang et al. | 375/285 |
| 2012/0128036 A1* | 5/2012 | Kang et al. | 375/144 |

FOREIGN PATENT DOCUMENTS

| | | |
|---|---|---|
| JP | 2004-364009 A | 12/2004 |
| KR | 1020000039664 A | 7/2000 |
| KR | 1020010102879 A | 11/2001 |
| KR | 1020060064472 A | 6/2006 |

OTHER PUBLICATIONS

International Search Report for PCT/KR2008/002643 filed May 9, 2008.

Written Opinion of the International Searching Authority for PCT/KR2008/002643 filed May 9, 2008.

* cited by examiner

HUMAN BODY COMMUNICATION SYSTEM AND COMMUNICATION METHOD THEREOF

TECHNICAL FIELD

The present invention disclosed herein relates to a communication system; and, more particularly, to a human body communication system using a human body as a channel.

The present invention has been derived from research undertaken as a part of IT R & D program of the Ministry of Information and Communication and Institute of Information Technology Association (MIC/IITA) [2006-S-072-02, human body communication controller SoC].

BACKGROUND ART

The human body communication uses a human body as a channel. Data is transmitted using a transmitter connected to a part of the human body. The transmitted data is recovered using a receiver connected to another part of the human body or outside the human body. The human body communication allows communication between portable devices or communication between a fixed device and a user to be made through user's contact. For example, communication between a personal digital assistant (PDA), a portable computer, a digital camera, an MP3 player and a mobile phone can be performed through user's contact. Such communication through user's contact may also be applied to, e.g., printers, credit cards, television reception, entrance systems and payment systems for transportation.

The human body transmits radio waves anisotropically while the air transmits radio waves isotropically. Thus, it is difficult for a receiver existing at an arbitrary position of the human body to receive accurate radio waves from a transmitter. The electric waves traveling through the human body loses more energy than those traveling through the air. The human body easily receives an interference signal from surroundings because of its conductivity.

DISCLOSURE OF INVENTION

Technical Problem

The present invention provides a human body communication system with improved performance of clock and data recovery.

The present invention also provides a human body communication system, which can perform efficient and stable frame synchronization by reducing the computation amount.

Technical Solution

Embodiments of the present invention provide human body communication systems using a human body as a channel including: a transmitter transmitting a frame including a preamble, which is a Manchester-encoded pseudo noise (PN) code, to the human body; and a receiver receiving the frame from the human body, performing Manchester-decoding on the frame, performing cross-correlation on the decoding result and the PN code, and performing frame synchronization using the cross-correlation result.

In some embodiments, the receiver performs the frame synchronization if an absolute value of the cross-correlation result reaches a target value. The receiver performs the frame synchronization when the frame is delayed by one chip if an absolute value of the cross-correlation result reaches a target value but is a negative number. The receiver performs the frame synchronization if an absolute value of the cross-correlation result reaches a target value in respective chips, which are located at an identical position in a plurality of frames.

In other embodiments, the receiver performs the frame synchronization if a difference value between two consecutive cross-correlation results reaches a target value. The receiver performs the frame synchronization when a difference value between two consecutive cross-correlation results reaches a target value in respective chips, which are located at an identical position in a plurality of frames. The receiver performs spread-spectrum demodulation on a header and data of the frame.

In still other embodiments, the receiver includes: an automatic gain controller maintaining a constant signal magnitude of the frame transmitted from the human body by amplification or attenuation; a clock and data recoverer recovering a clock from the frame transmitted from the automatic gain controller, and recovering data of the frame by using the clock; a frame synchronizer performing frame synchronization on the data-recovered frame; a demodulator demodulating a header and data of the frame having undergone the frame synchronization; and a channel decoder performing channel error correction encoding on the demodulated header and data. The receiver further comprises an equalization filter that compensates frame distortion caused by the human body and transmits the distortion-compensated frame to the automatic gain controller.

In even other embodiments, the transmitter performs spread-spectrum modulation on a header and data of the frame. The transmitter comprises a channel encoder that performs channel error correction encoding.

In other embodiments of the present invention, human body communication methods using a human body as a channel include: transmitting a frame including a preamble to the human body, the preamble being a Manchester-encoded pseudo noise (PN) code; receiving the frame from the human body to perform Manchester decoding thereon; performing cross-correlation on the decoding result and the PN code; and performing frame synchronization by using the cross-correlation result.

In some embodiments, the frame synchronization is performed if an absolute value of the cross-correlation result reaches a target value. If an absolute value of the cross-correlation result reaches a target value but is a negative number, the frame is delayed by one chip, and the frame synchronization is performed when the frame is delayed by one chip. The frame synchronization is performed if an absolute value of the cross-correlation result reaches a target value in respective chips, which are located at an identical position in a plurality of frames.

In other embodiments, the frame synchronization is performed if a difference value between two consecutive cross-correlation results reaches a target value. The frame synchronization is performed if a difference value between two consecutive cross-correlation results reaches a target value in respective chips, which are located at an identical position in a plurality of frames.

Advantageous Effects

A human body communication system according to the present invention improves clock and data recovery performance by using a Manchester-encoded pseudo noise (PN) code as a preamble. The human body communication system according to the present invention performs cross-correlation on a Manchester-decoded frame and the PN code, and performs frame synchronization according to a correlation value. The human body communication system according to the present invention performs frame synchronization by using a difference between correlation values. The computation amount of the frame synchronization is decreased because the number of bits associated with the cross-correlation is reduced to half the number of bits of the preamble.

BEST MODE FOR CARRYING OUT THE INVENTION

A human body communication system according to the present invention uses a Manchester-encoded pseudo noise code as a preamble. Thus, clock and data recovery performance of a receiver is improved. The human body communication system according to the present invention performs cross-correlation on a Manchester-decoded frame and a pseudo noise code, and performs frame synchronization even if a correlation value is a negative number. The human body communication system according to the present invention performs frame synchronization by using a difference between a positive correlation value and a negative correlation value. Thus, the human body communication system according to the present invention performs stable frame synchronization with small computation amount in the human body having a low signal-to-noise ratio (SNR).

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
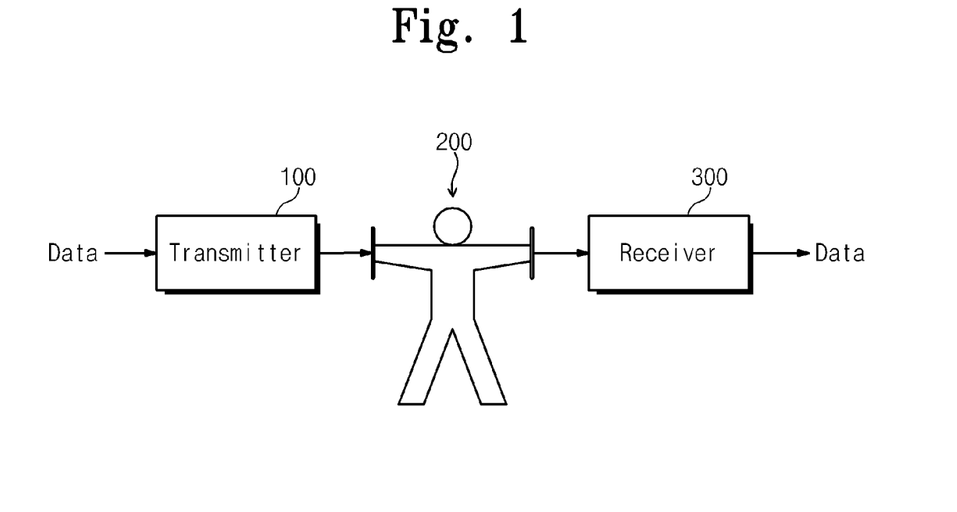
FIG. 1 is a block diagram of a human body communication system according to an embodiment of the present invention.

FIG. 1 is a block diagram of a human body communication system according to an embodiment of the present invention. Referring to FIG. 1, the human body communication system includes a human body 200 used as a channel, a transmitter 100 connected to one part of the human body 200, and a receiver 300 connected to another part of the human body 200 or outside the human body 200. For example, the transmitter 100 is connected to one part of the human body 200, and the receiver 300 may exist in a bag. The transmitter 100 modulates data transmitted from the outside and transmits to the human body 200. The human body 200 transmits a signal transmitted from the transmitter 100 to the receiver 300. The receiver 300 demodulates the signal transmitted from the human body 200 to recover data. The recovered data is delivered to the outside.

Figure 2:
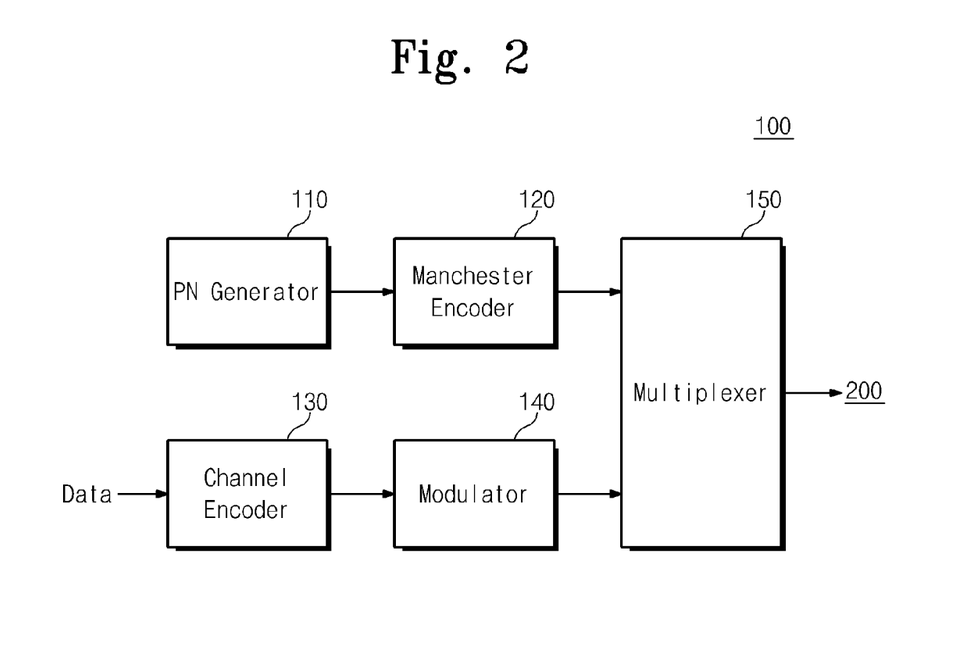
FIG. 2 is a block diagram of a transmitter illustrated in FIG. 1.

FIG. 2 is a block diagram of the transmitter 100 of FIG. 1. Referring to FIG. 2, the transmitter 100 according to an embodiment of the present invention includes a pseudo-noise (PN) generator 110, a Manchester encoder 120, a channel encoder 130, a modulator 140 and a multiplexer 150. The transmitter 100 includes a separate clock generator (not shown). The PN generator 110, the Manchester encoder 120, the channel encoder 130, the modulator 140 and the multiplexer 150 operate in response to a clock generated by the clock generator.

When data is transmitted, the PN generator 110 generates a preset PN code. The PN code includes a plurality of chips. The PN code is transmitted to the Manchester encoder 120. The Manchester encoder 120 performs Manchester-encoding on the PN node. When a signal is transmitted, the Manchester encoder 120 outputs the transmitted signal and an inverted signal of the transmitted signal. For example, if a PN code transmitted to the Manchester encoder 120 is "1", the Manchester encoder 120 outputs "10". If a PN code transmitted to the Manchester encoder 120 is "0", the Manchester encoder 120 outputs "01". If a PN code transmitted to the Manchester encoder 120 is "10", the Manchester encoder 120 outputs "1001". The Manchester-encoded PN code is transmitted to the multiplexer 150.

The channel encoder 130 performs channel error correction encoding on data transmitted from the outside. The channel encoder 130 transmits a header and data having undergone the channel error correction encoding to the modulator 140. The header may be transmitted from the outside together with the data. The header may be generated in the channel encoder 130. The header may include information of methods and conditions of the channel error correction encoding.

The channel encoder 130 may perform block encoding that adds parity bits for error correction to the data. The channel encoder 130 may perform convolution coding that determines data to be transmitted according to values of transmitted data and previously transmitted data. The channel encoder 130 may perform interleaving that arranges data to be transmitted in a block unit of rows and columns and converts the rows and columns. The channel encoder 130 may scramble the data by using a key in order to improve data security.

The modulator 140 receives the header and data from the channel encoder 130. The modulator 140 performs spread-spectrum modulation on the header and data. The modulator 140 may include a PN generator to generate a PN code for the spread-spectrum modulation. The spread-spectrum-modulated header and data are transmitted to the multiplexer 150.

The multiplexer 150 receives the Manchester-encoded PN code from the Manchester encoder 120. The multiplexer 150 receives the spread-spectrum-modulated header and data from the modulator 140. The multiplexer 150 forms a frame by using the Manchester-encoded PN code as a preamble. That is, the multiplexer 150 forms the frame by using the preamble, which is the Manchester-encoded PN code, and the spread-spectrum-modulated header and data. The multiplexer 150 delivers the frame to the human body 200 (see FIG. 1).

Figure 3:
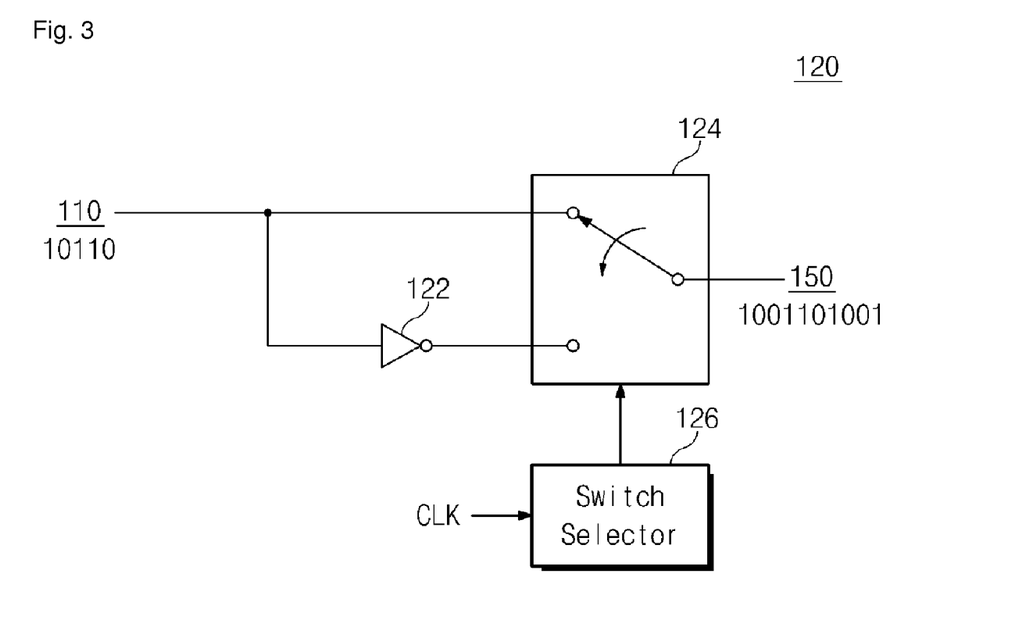
FIG. 3 is a circuit diagram of a Manchester encoder illustrated in FIG. 2.

FIG. 3 is a circuit diagram of the Manchester encoder 120 illustrated in FIG. 2. Referring to FIGS. 2 and 3, the Manchester encoder 120 according to the embodiment of the present invention includes an inverter 122, a switch 124 and a switch selector 126. The PN code transmitted from the PN generator 110 is delivered to the switch 124 and an input terminal of the inverter 122. An output terminal of the inverter 122 is connected to the switch 124. The switch 124 connects an output of the PN generator 110 to an input of the multiplexer 150 or connects the output of the PN generator 110 to the input of the multiplexer 150 through the inverter 122, in response to the control of the switch selector 126. The switch selector 126 controls the switch 124 in response to a clock generated in the clock generator (not shown). When one chip is transmitted from the PN generator 110, the switch 124 connects the multiplexer 150 with the PN generator 110, and connects the multiplexer 150 with the PN generator 110 through the inverter 122. As shown in FIG. 3, if a PN code transmitted from the PN generator 110 is "10110", the Manchester encoder 120 outputs "1001101001".

Figure 4:
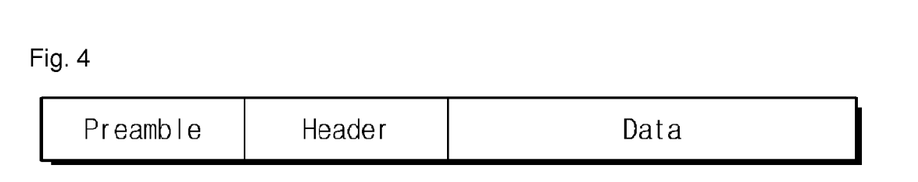
FIG. 4 is a block diagram of a frame generated by a multiplexer illustrated in FIG. 2.

FIG. 4 is a block diagram of a frame formed by the multiplexer 150 of FIG. 2. Referring to FIG. 2 through 4, the PN generator 110 generates a preset PN code. The Manchester encoder 120 performs Manchester encoding on the PN code transmitted from the PN generator 110. If the PN code is "10110", a Manchester-encoded PN code is "1001101001". The channel encoder 130 receives data from the outside. The channel encoder 130 may further receive a header from the outside. The channel encoder 130 performs channel error correction encoding on the data. The modulator 140 receives the header and data from the channel encoder 130. The modulator 140 performs spread-spectrum modulation on the header and data. The multiplexer 150 receives the Manchester-encoded PN code from the Manchester encoder 120 to form a preamble. The multiplexer 150 forms a frame by using the preamble, and the header and data transmitted from the modulator 140. The frame is delivered to the human body 200 (see FIG. 1).

Figure 5:
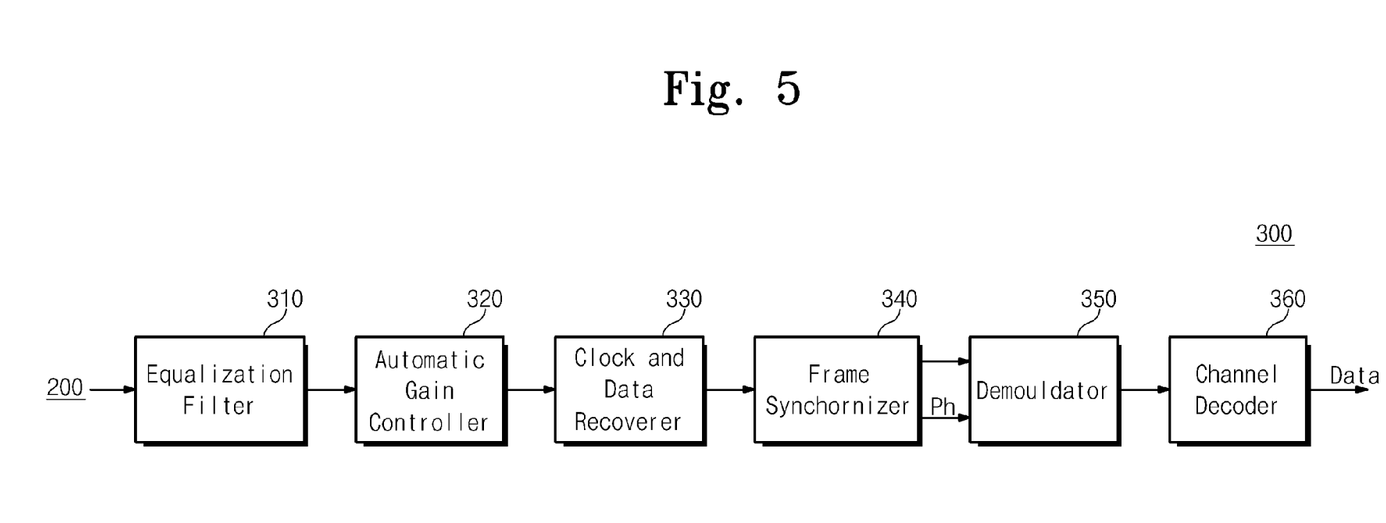
FIG. 5 is a block diagram of a receiver illustrated in FIG. 1.

FIG. 5 is a block diagram of the receiver 300 illustrated in FIG. 1. Referring to FIG. 5, the receiver 300 according to the embodiment of the present invention includes an equalization filter 310, an automatic gain controller 320, a clock and data recoverer 330, a frame synchronizer 340, a demodulator 350 and a channel decoder 360. The equalization filter 310 receives a frame from the human body 200 (see FIG. 1). The equalization filter 310 compensates distortion of the frame generated by the human body 200. The equalization filter 310 removes external baseband noise. When a signal is transmitted through a human body channel, attenuation and phase distortion occur because of a frequency response characteristic of the human body. Also, noise is introduced to the signal from an external electronic and electric device. The frequency response characteristic is not greatly affected by body shapes. Thus, it can be understood that the frequency response characteristic is identical between people. The equalization filter 310 has a filter characteristic for compensating distortion caused by the frequency response characteristic of the human body. Since the equalization filter 310 has characteristics of a low-pass filter, the external baseband noise can also be removed. The automatic gain controller 320 receives the frame from the equalization filter 310. The automatic gain controller 320 amplifies or attenuates the signal magnitude of the frame to maintain the constant signal magnitude of the frame.

The clock and data recoverer 330 receives the frame from the automatic gain controller 320. The clock and data recoverer 330 recovers a clock from the transmitted frame. The clock and data recoverer 330 recovers the data of the frame by using the recovered clock. The clock and data recoverer 330 includes a phase locked loop for re-covering a clock from the frame. If consecutive "1"s or "0"s are transmitted to the clock and data recoverer 330, performance of the phase locked loop is deteriorated. For example, a preamble, a header or data of a frame transmitted to the clock and data recoverer 330 may include "11111". If a signal is transmitted at a constant level for a predetermined time, the phase locked loop may determine "11111" as "1111" or "111111". The transmitter 100 (see FIG. 2) according to the embodiment of the present invention forms a preamble by using a Manchester-encoded PN code. The preamble transmitted to the clock and data recoverer 330 prevents the identical signal from being transmitted over two chips or more. Thus, the clock recovery performance of the clock and data recoverer 330 is stably performed.

The frame synchronizer 340 receives the frame from the clock and data recoverer 330. The frame synchronizer 340 performs frame synchronization by using the preamble formed by the Manchester-encoded PN code. The frame synchronizer 340 generates a header start pulse (Ph) at a start position of the header.

The demodulator 350 receives the frame and the header start pulse (Ph) from the frame synchronizer 340. The demodulator 350 receives the header start pulse (Ph) and performs spread-spectrum demodulation on the frame transmitted from the frame synchronizer 340. Since the header start pulse (Ph) is generated at the start position of the header, the demodulator 350 can perform the spread-spectrum demodulation only on the header and data of the frame.

The channel decoder 360 receives the spread-spectrum-demodulated header and data from the demodulator 350. The channel decoder 360 performs channel error correction decoding on the data according to information contained in the header. The channel decoder 360 may perform block decoding and/or convolution decoding on the data according to the information contained in the header. The channel decoder 360 may perform interleaving and/or scrambling on the data according to the information contained in the header. The data having undergone the channel error correction decoding is delivered to the outside.

Figure 6:
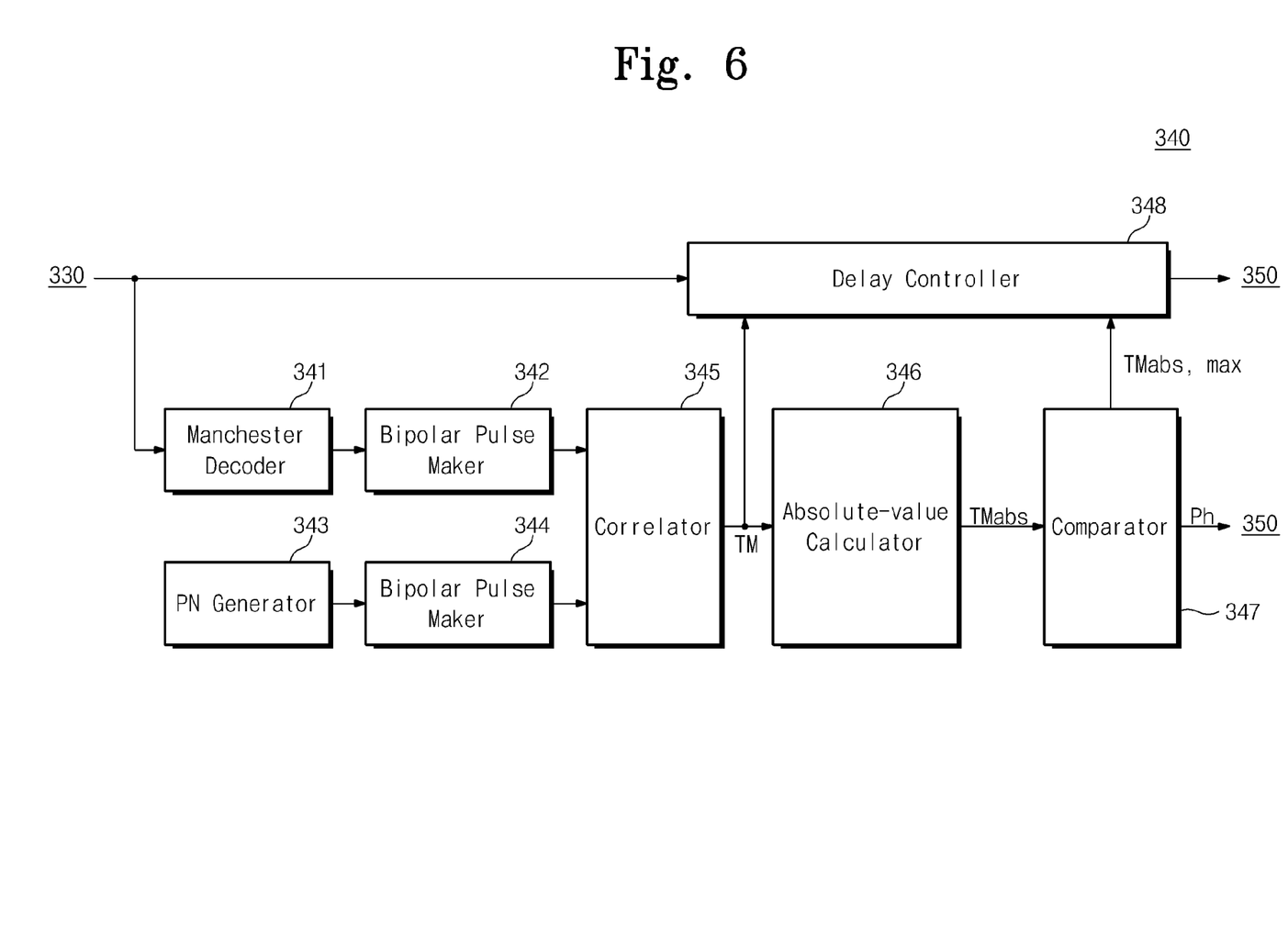
FIG. 6 is a block diagram of a frame synchronizer illustrated in FIG. 5.

FIG. 6 is a block diagram of the frame synchronizer 340 illustrated in FIG. 5. Referring to FIG. 6, the frame synchronizer 340 includes a Manchester decoder 341, bipolar pulse makers 342 and 344, a PN generator 343, a correlator 345, an absolute-value calculator 346, a comparator 347, and a delay controller 348.

The Manchester decoder 341 receives a frame from the clock and data recoverer 330. The Manchester decoder 341 Manchester-decodes the frame. The bipolar pulse maker 342 receives the Manchester-decoded frame from the Manchester decoder 341. The bipolar pulse maker 342 performs bipolar encoding on the Manchester-decoded frame. For example, if a preamble, a header or data of the Manchester-decoded frame is "10110", the bipolar pulse maker 342 outputs "1(−1)11(−1)". The PN generator 343 generates a PN code. The PN code generated by the PN generator 343 is identical to a PN code generated by the PN generator 110 of the transmitter 100 (see FIG. 2). The bipolar pulse maker 344 performs bipolar encoding on the PN code transmitted from the PN generator 343. The correlator 345 receives the Manchester-decoded frame and the PN code from the bipolar pulse makers 342 and 344. The correlator 345 performs cross-correlation on the Manchester-decoded frame and the PN code. A correlation value (TM) is transmitted to the absolute-value calculator 346 and the delay controller 348. The absolute-value calculator 346 calculates the absolute value (TMabs) of the correlation value (TM). The comparator 347 determines whether the absolute value (TMabs) reaches a target value. If the absolute value (TMabs) reaches the target value, the comparator 347 generates a header start pulse (Ph) that indicates the beginning of the header. The comparator 347 generates a target pulse (TMabs, max) indicating that the absolute value (TMabs) has reached the target value. The delay controller 348 receives the frame, the correlation value (TM) and the target pulse (TMabs, max). When the target pulse (TMabs, max) is transmitted, the delay controller 348 determines whether the correlation value (TM) is a positive number or a negative number. If the correlation value (TM) is a positive number, the delay controller 348 transmits the frame to the demodulator 350. If the correlation value (TM) is a negative number, the delay controller 348 delays the frame by one chip and then transmits to the demodulator 350. The delay controller 348 may include a shift register and/or a plurality of flip-flops.

Figure 7:
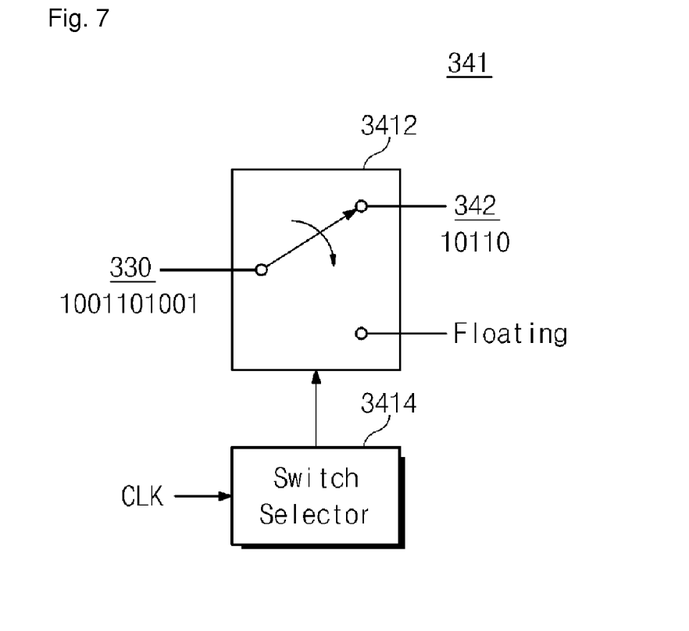
FIG. 7 is a circuit diagram of a Manchester decoder illustrated in FIG. 6.

FIG. 7 is a circuit diagram of the Manchester decoder 341 illustrated in FIG. 6. Referring to FIG. 7, the Manchester decoder 341 includes a switch 3412 and a switch selector 3414. The switch 3412 is connected to the clock and data recoverer 330, the bipolar pulse maker 342 and a floating. The switch 3412 connects an input of the bipolar pulse maker 342 to the clock and data recoverer 330 or floats the input of the bipolar pulse maker 342, in response to the control of the switch selector 3414. The switch selector 3414 operates in response to a clock (CLK) recovered by the clock and data recoverer 330. When one chip is transmitted from the clock and data recoverer 330, the switch selector 3414 transits the switch 3412. For example, when "1001101001" is transmitted to a switch, the switch outputs "10110". The Manchester decoder 341 according to the embodiment of the present invention may include a plurality of switches. The Manchester decoder 341 according to the embodiment of the present invention may include a plurality of buffers. It is clear that the Manchester decoder 341 according to the embodiment of the present invention can be variously applied by those skilled in the art.

Figure 8:
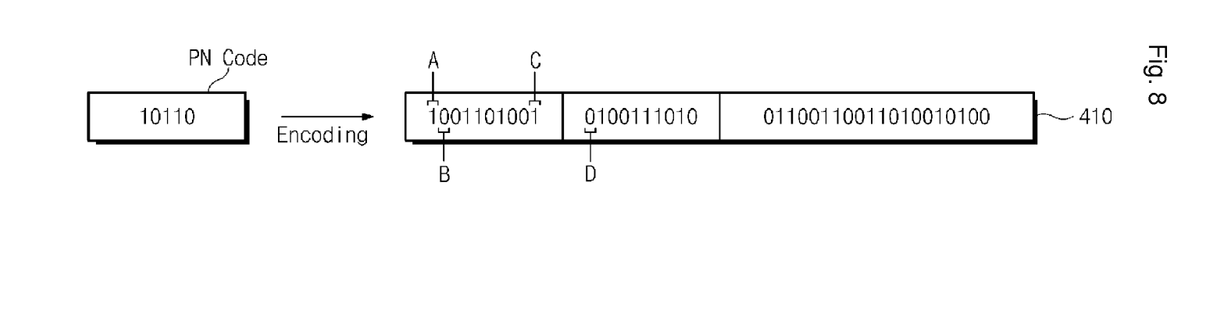
FIG. 8 is a diagram illustrating a result of Manchester decoding performed on a frame.

FIG. 8 is a diagram illustrating a process of Manchester decoding on a frame. Referring to FIGS. 1, 5, 6 and 8, the PN generator 110 of the transmitter 100 generates a PN code of "10110". The Manchester encoder 120 Manchester-encodes the PN code into "1001101001". The multiplexer 150 forms a frame 410 by using the Manchester-encoded PN code as a preamble. Although a PN code, a preamble, a header and data are illustrated in FIG. 8, the present invention is not limited thereto. The Manchester decoder 341 performs Manchester decoding on the frame 410.

The number of bits resulting from the Manchester decoding is the half the number of bits of a signal input to the Manchester decoder 341. The number of bits undergoing the cross-correlation in the correlator 345 is identical to the number of bits of the PN code. Thus, the Manchester decoder 341 sequentially receives bits more than twice as many as bits of the PN code. For example, if the PN code is "10110" of 5 bits, the Manchester decoder 341 receives 10 bits of the input frame 410, i.e., "1001101001". The input bits are sequentially input to a shifter register. The Manchester decoder 341 sequentially outputs 1st, 3rd, 5th, 7th and 9th bits of the input bits, or 2nd, 4th, 6th, 8th and 10th bits. The Manchester decoding may begin with reference sign A. Then, the Manchester decoder 341 outputs 1st, 3rd, 5th, 7th and 9th bits of input bits. The output of the Manchester decoder 341 is "10110". The correlator 345 performs cross-correlation on the output of the Manchester decoder 341 and the PN code. Since the PN code and the preamble of the frame 420 are identical, a correlation value (TM) is is a maximum value (e.g., 5) when the preamble is completely transmitted to the correlator 345. The comparator 347 generates a header start pulse (Ph). That is, when a chip of reference sign C is transmitted to the Manchester decoder 341, the header start pulse (Ph) is generated. Chips transmitted after the header start pulse (Ph) are a header and data. Thus, frame synchronization is performed.

The Manchester decoding may begin with reference sign B. The output of the Manchester decoder 341 is "01001". That is, a Manchester-decoded preamble is an inverted signal of the PN code. The correlator 345 performs cross-correlation on the output of the Manchester decoder 341 and the PN code. Since the output of the Manchester decoder 341 is the inverted signal of the PN code, the correlation value (TM) is a negative number when the preamble is completely transmitted to the correlator 345. The absolute value of the correlation value (TM) is the maximum value (e.g., 5). The comparator 347 generates a header start pulse (Ph). That is, when a chip of reference sign D is transmitted to the Manchester decoder 341, the pulse start pulse (Ph) is generated. Chips transmitted after the header start pulse (Ph) are a header and data faster by one chip. Since the correlation value (TM) is a negative number, the delay controller 348 delays the frame transmitted from the clock and data recoverer 330 by one chip and transmits it. Thus, the frame synchronization is performed.

If the noise of the human body increases, the preamble of the frame 410 may not be correctly transmitted. The human body communication system according to the embodiment of the present invention performs frame synchronization by using an absolute value of a correlation value of the Manchester-decoded preamble and the PN code. That is, dual frame synchronization is performed using the transmitted PN code and the inverted signal of the transmitted PN code. Thus, frame synchronization performance is improved. A simulation result indicates that frame synchronization is performed mainly at a positive correlation value in the case of a channel having a high SNR. In the case of a channel having a low SNR, the frame synchronization is performed mainly at a negative correlation value.

Figure 9:
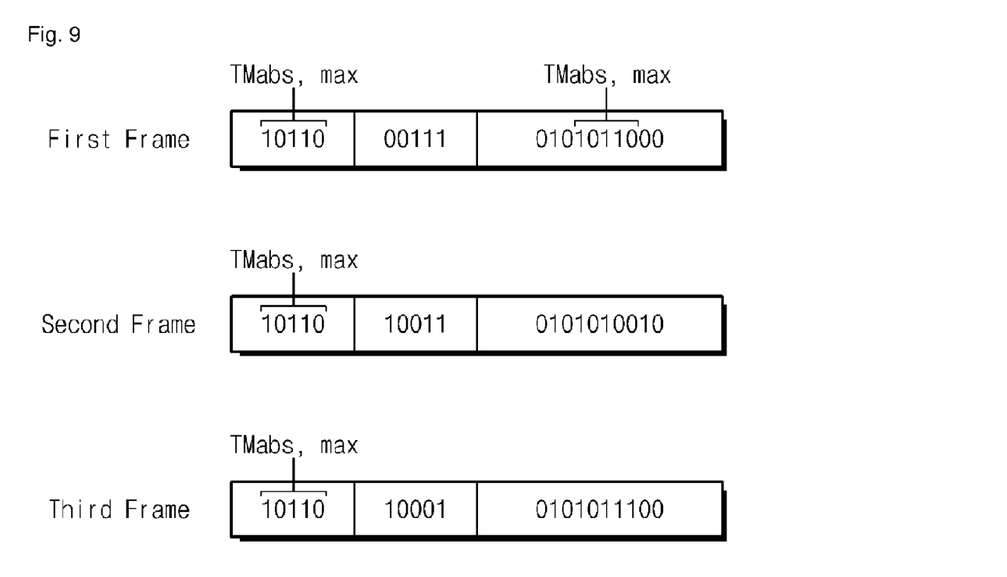
FIG. 9 is a diagram illustrating frame synchronization according to another embodiment of the present invention.

FIG. 9 is a diagram illustrating frame synchronization according to another embodiment of the present invention. Referring to FIGS. 5, 6 and 9, first through third frames are frames that are sequentially Manchester-decoded. If a PN code is "10110", a correlation value (TM) is a maximum value when chips of the frame represent "10110". However, not only preambles of the frames but also headers or data may include chips representing "10110". In FIG. 9, data chips of the first frame represent "10110". Since an absolute value (TMabs) of a correlation value (TM) is the maximum value in the preamble and the data of the first frame, a target pulse (TMabs, max) is generated in the preamble and the data of the first frame. Accordingly, the frame synchronization is not normally performed. The frame synchronizer 340 according to the embodiment of the present invention can perform frame synchronization when the absolute value (TMabs) of the correlation value (TM) has reached the maximum at chips located at the same position in a plurality of frames. Thus, the frame synchronization is normally performed when chips of the same pattern as the PN code are present in headers or data of frames.

Figure 10:
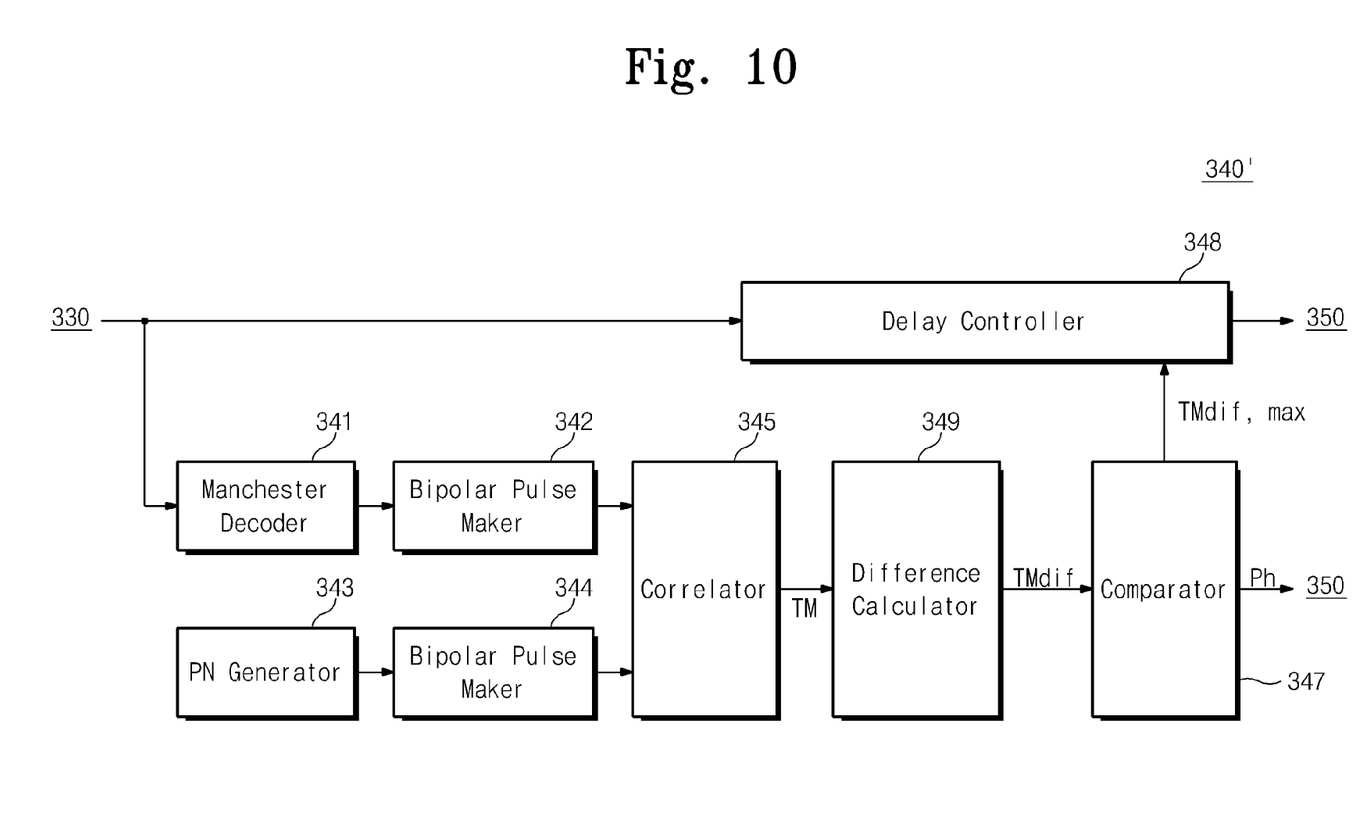
FIG. 10 is a block diagram of a frame synchronizer according to another embodiment of the present invention.

FIG. 10 is a block diagram of a frame synchronizer 340' according to another embodiment of the present invention. Referring to FIG. 10, the frame synchronizer 340 according to another embodiment of the present invention includes a Manchester decoder 341, bipolar pulse makers 342 and 344, a PN generator 343, a correlator 345, a difference calculator 349, a comparator 347 and a delay controller 348. The Manchester decoder 341 performs Manchester decoding on a transmitted frame. The PN generator 343 generates an identical PN code to that of the PN generator 110 of the transmitter 100. The bipolar pulse makers 342 and 344 each perform bipolar encoding on the Manchester-decoded frame and the PN code. The correlator 345 performs cross-correlation on the output of the Manchester decoder 341 and the PN code to output a correlation value (TM). The difference calculator 349 calculates a difference between two consecutive correlation values and outputs the different value (TMdif). When the different value (TMdif) reaches a maximum value, the comparator 347 generates a header start pulse (Ph). When the difference value (TMdif) reaches the maximum value or a target value, the comparator 347 outputs a target pulse (TMdif, max). When the target pulse (TMdif, max) is transmitted, the delay controller 348 delays the frame by one chip and outputs it.

Referring to FIGS. 8 and 10, the Manchester decoding may be performed from a chip at a position of reference sign A or B. When the Manchester decoding is performed from reference sign A, a decoded preamble is identical to the PN code. When the Manchester decoding is performed from reference sign B, the decoded preamble is an inverted signal of the PN code. The correlator 345 calculates the correlation value (TM). If a preamble that is identical to the PN code is transmitted, the correlation value (TM) is the maximum value. If a preamble that is identical to the inverted PN code is transmitted, the correlation value (TM) is a minimum value. Accordingly, the difference value (TMdif) between the correlation value (TM) of the identical preamble to the PN code and the correlation value (TM) of the identical preamble to the inverted PN code is maximized when a chip at a position of reference sign D is transmitted. When the difference value (TMdif) is the maximum value, a header start pulse (Ph) and a target pulse (TMdif, max) are generated. When the target pulse (TMdif, max) is transmitted, the delay controller 348 delays the header by one chip and outputs it. Thus, the frame synchronization is performed.

The human body communication system according to the present invention uses a Manchester-encoded PN code as a preamble. Accordingly, clock and data recovery performance of the receiver is improved. The human body communication system according to the embodiment of the present invention performs cross-correlation on the Manchester-decoded frame and the PN code, and performs frame synchronization even if the correlation value is a negative number. Accordingly, the human body communication system according to the present invention improves frame synchronization performance in the human body having a low SNR.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A human body communication system using a human body as a channel, the system comprising:
a transmitter transmitting a frame including a preamble to the human body, the preamble being a Manchester-encoded pseudo noise (PN) code; and
a receiver receiving the frame from the human body, performing Manchester-decoding on the frame, performing cross-correlation on the decoding result and the PN code, and performing frame synchronization using the cross-correlation result,
wherein the receiver performs the frame synchronization if an absolute value of the cross-correlation result reaches a target value and delays the frame by one chip when the cross-correlation result is a negative number.

2. The system of claim 1, wherein the receiver performs the frame synchronization if an absolute value of the cross-correlation result reaches a target value in respective chips, which are located at an identical position in a plurality of frames.

3. The system of claim 1, wherein the receiver performs the frame synchronization if a difference value between two consecutive cross-correlation results reaches a target value.

4. The system of claim 1, wherein the receiver performs the frame synchronization when a difference value between two consecutive cross-correlation results reaches a target value in respective chips, which are located at an identical position in a plurality of frames.

5. The system of claim 1, wherein the receiver performs spread-spectrum demodulation on a header and data of the frame.

6. The system of claim 1, wherein the receiver comprises:
an automatic gain controller maintaining a constant signal magnitude of the frame transmitted from the human body by amplification or attenuation;
a clock and data recoverer recovering a clock from the frame transmitted from the automatic gain controller, and recovering data of the frame by using the clock;
a frame synchronizer performing frame synchronization on the data-recovered frame;
a demodulator demodulating a header and data of the frame having undergone the frame synchronization; and
a channel decoder performing channel error correction coding on the de-modulated header and data.

7. The system of claim 6, wherein the receiver further comprises an equalization filter that compensates frame distortion caused by the human body and transmits the distortion-compensated frame to the automatic gain controller.

8. The system of claim 1, wherein the transmitter performs spread-spectrum modulation on a header and data of the frame.

9. The system of claim 1, wherein the transmitter comprises a channel encoder that performs channel error correction encoding.

10. A human body communication method using a human body as a channel, the method comprising:
transmitting a frame including a preamble to the human body, the preamble being a Manchester-encoded pseudo noise (PN) code;
receiving the frame from the human body to perform Manchester decoding thereon;
performing cross-correlation on the decoding result and the PN code; and
performing frame synchronization by using the cross-correlation result,
wherein if an absolute value of the cross-correlation result reaches a target value but is a negative number, the frame is delayed by one chip, and the frame synchronization is performed when the frame is delayed by one chip.

11. The method of claim 10, wherein the frame synchronization is performed if an absolute value of the cross-correlation result reaches a target value in respective chips, which are located at an identical position in a plurality of frames.

12. The method of claim 10, wherein the frame synchronization is performed if a difference value between two consecutive cross-correlation results reaches a target value.

13. The method of claim 10, wherein the frame synchronization is performed if a difference value between two consecutive cross-correlation results reaches a target value in respective chips, which are located at an identical position in a plurality of frames.

* * * * *